F. S. HEBDEN.
SCALE.
APPLICATION FILED MAY 7, 1910.
1,034,013.
Patented July 30, 1912.
2 SHEETS—SHEET 1.
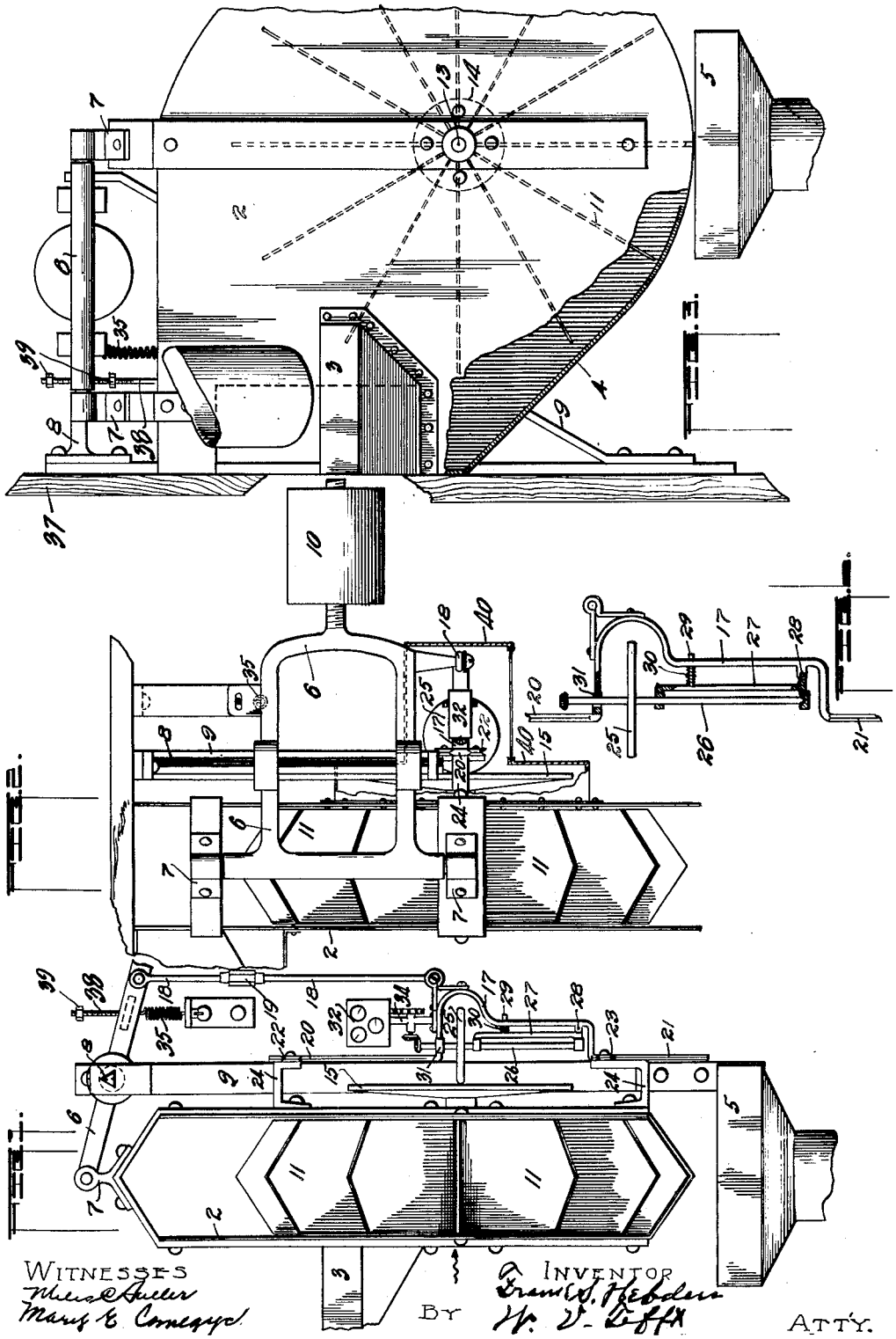

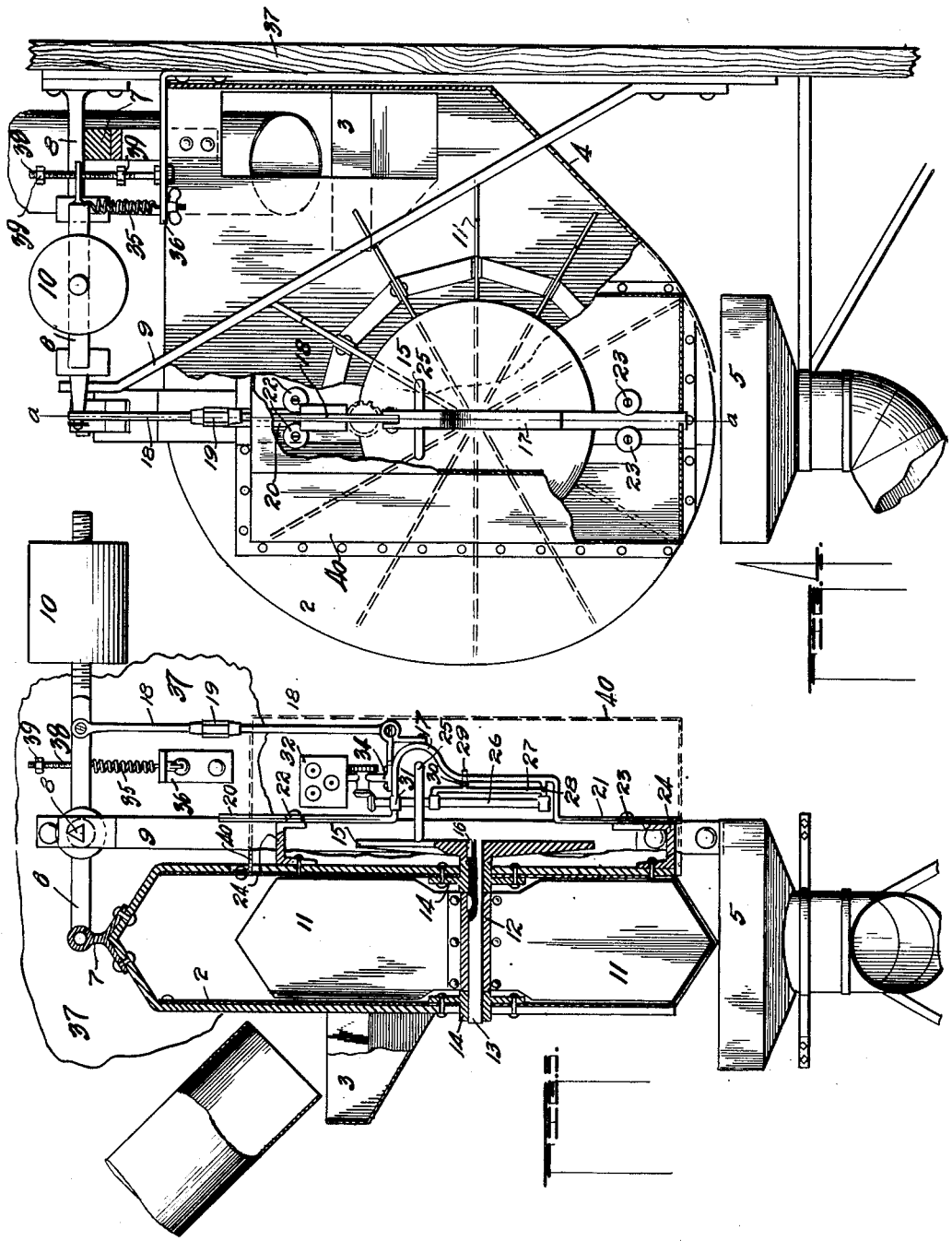

UNITED STATES PATENT OFFICE.

FRANK S. HEBDEN, OF PEORIA, ILLINOIS.

SCALE.

1,034,013.  Specification of Letters Patent.  Patented July 30, 1912.

Application filed May 7, 1910. Serial No. 559,982.

*To all whom it may concern:*

Be it known that I, FRANK S. HEBDEN, a citizen of the United States, residing at Peoria, in the county of Peoria and State of Illinois, have invented certain new and useful Improvements in Scales, of which the following is a specification.

My invention relates to scales and has for its object the weighing of grain or other material as it flows in a constant stream or while it is conveyed through a chute or trough.

My invention relates principally to means for conducting grain or other material from discharge to receiving members disposed in a relation relatively to cause the grain to readily flow from one to the other; to means actuated by the flowing grain to transmit power to actuate a tally mechanism; to means for suspending the grain conveying structure or hopper upon a normal balance; to means as a weight or spring, serving to resist the depression of the conveyer or hopper under the influence of the weight of grain flowing therethrough; to means associated with the hopper and the tally mechanism actuated by the force of moving grain in the hopper to operate the tally mechanism and associated in a relation to vary the speed of coöperating parts for the purpose of properly weighing the grain as it flows through the hopper in variable quantities.

My invention further relates to combinations of parts and details of construction hereinafter more particularly described.

In the drawings, Figure 1 is a front elevation of my device with a portion of the scale beam adapted to carry a weight removed; Fig. 2 is a top view of my device; Fig. 3 is a side elevation of the same, viewed from the direction as indicated by the arrow in Fig. 1, having a portion broken away to show interior construction; Fig. 4 is a side elevation viewed from the opposite side of the structure from that disclosed in Fig. 3, with portions broken away to better disclose interior construction; Fig. 5 is a vertical sectional view, substantially upon the line *a—a* of Fig. 4, showing parts broken away to illustrate certain detail connection of parts; and Fig. 6 is a detail view.

In the drawings, as disclosed in Figs. 2, 3 and 4, 2 is a housing or frame structure, which will hereafter be referred to as the hopper, provided with an inlet opening in the wall thereof, with which is connected the chute 3, through which opening grain is adapted to be delivered to the hopper, which grain is discharged upon an inclined troughway 4 which leads to an opening in the bottom of the hopper 2 adapted to deliver into a hopper 5 which is suitably supported at the mouth of the opening and from which grain may be delivered to any point desired. The hopper is connected with a scale beam 6 by means of the yoke 7 which engages trunnions upon the scale beam. The scale beam is furcated or divided in the manner shown in Fig. 2 and is supported upon a suitable knife edge upon the arm 8 secured to a suitable frame structure which said arm may be reinforced by means of a brace as 9.

10 is a balance weight supported upon the screw thread extension from the scale beam, as particularly shown in Fig. 2. The weight of the hopper and its associated mechanical parts is adapted to be counterbalanced by the weight 10 on the scale beam so that when free from a load of grain and free from the supplementary spring pressure adapted to be applied in connection with the operative structure, the hopper will be balanced in the position shown in Fig. 5. A paddle wheel is designed to be supported within the hopper adapted to be turned by the contact of moving grain passing through the hopper. This paddle wheel comprises paddles as 11 connected with a sleeve 12 by means of ribs thereon substantially in the manner shown in Fig. 5 and said sleeve is adapted to be secured to shaft 13 journaled in boxings 14 in the walls of the hopper. The particular means of connecting the sleeve with the shaft is shown in Fig. 5, in which a stud on the sleeve is shown seated in a depression in the shaft. 15 is a disk wheel secured to said shaft 13 by means of key 16.

17 is a framework supported by means of rods 18, one connected with scale beam 6 and the other with the frame 17, the two rods being connected by means of turn buckle 19. The frame 17 is provided with the upwardly and downwardly projected arms 20 and 21 which are flattened into rectangular shape and are adapted to bear each between a pair of guide rollers as 22, 23 shown in Fig. 4, said guide rollers being supported upon angle bars or frame parts 24 (shown in Fig. 5) which are secured to hopper 2. This connection of the frame part 17 with the hopper and the scale beam 6 causes the same to be supported in a relation that with the movement of the connected parts its position will be changed.

25 is a disk wheel supported upon shaft 26 in a manner to cause it to have a constant bearing relation against the outer face of disk 15. The shaft 26 is journaled in a framework 27 which is pivoted as at 28 to a stud or arm on frame 17.

29 is a pin projecting laterally from frame piece 17 adapted to bear through a perforation in framewrok 27 and 30 is a coil spring interposed between frame parts 17 and 27 to provide a resilient force to be exerted against frame 27 to cause disk 25 to bear constantly against the surface of disk 15. The upper end of shaft 26 is carried through a journal bearing at 31 in frame 17, said journal being of sufficient size to allow a slight lateral movement of said shaft to and from disk 15 to compensate for any variation of the surface of disk 15 from a vertical plane in line with the face thereof.

32 is a register, but as this register does not constitute any part of my invention, the particular construction of the same is not shown and is not described. The register is supported upon an arm 34 secured to frame 17 and in addition to supporting the register, it supports a shaft, miter gear and a cog wheel, the miter gear adapted to mesh with a miter gear upon the upper end of shaft 26 and the cog wheel adapted to coöperate with suitable cog connection in the meter to properly actuate the latter to effect the proper operation of the register.

35 is a spring connected at one end with the scale beam, and the othei end thereof being threaded and provided with a thumb nut is connected with the arm 36 which has a fixed connection with a stationary frame 37. Spring 35 is adapted to exert a counteracting force against the weight of grain as in the operation of the machine such grain is passed through the hopper in a continuous stream and it is the regulated tension of the spring that is intended to serve as the proper expansible force that will permit disks 15 and 25 to be adjusted relatively through the movement of balance bar 6 under the influence of the hopper as it is depressed in different degrees under any variations in the weight of the material flowing therethrough.

In applying the structural parts, the weight of the hopper is first balanced by means of weight 10 so that it will occupy the position shown in Fig. 5, then the spring 35 is attached and properly adjusted by means of the thumb nut to exert a force to position the parts as shown in Fig. 1 so that disk 25 will bear exactly at the vertical and horizontal center of disk 15.

38 is an adjustable rod provided with stop nuts 39 to limit the upward and downward movement of the scale beam.

40 is a housing adapted to inclose frame 17 and its connected parts and parts connected with the hopper that are designed to coöperate therewith and is provided for the purpose of protecting against dirt and refuse that might accumulate thereon and interfere with the operation of the device.

In the operation of the device, in weighing grain or other material, such material is adapted to be delivered into chute 3 from which it will be deflected into hopper 2, the grain so entering passing along the trough portion 4 of the hopper and finally out through the opening in the bottom thereof and into hopper 5. The grain will exert a varying force, according to quantity, in weight to depress the hopper and in passing will contact with the paddles 11, causing the wheel to be turned at the same speed as that of the moving grain and with it shaft 13 and disk wheel 15. The variable weight of the grain passing through the hopper will effect a variable vertical movement thereof, controlled and regulated by spring 35, which spring is itself regulated to exert a resisting force properly proportioned, as common in the ordinary spring scale. The downward movement of the hopper effecting a downward movement of the end of the scale beam with which it connects, will cause an upward movement of the opposite end of the scale beam at points beyond its fulcrum support, and because of the connection of frame 17 therewith through rod 18, the framework 17 will be raised, carrying with it the disk 15. In proportion as the weight is added to that of the hopper by grain being introduced therein, resulting in the hopper being depressed, disk 25 will be moved from its normal position, which is at the center of disk 15, upwardly with relation to said center point, that is, disk 15 will move downwardly and disk 25 upwardly, owing to the reverse direction of movement of their respective supports, and proportionately the same distances, and as the weight of the grain varies, resulting in different degrees of depression of the hopper, so the distance between the center point of disk 15 and that of disk wheel 25 will be changed. It is the communicated movement of disk wheel 25 from the center of disk wheel 15 that causes the register to be operated to properly measure the weight of the grain being passed through the hopper and it is the length of movement of disk 25 as compared with the movement of the paddle wheel that effects the proper measuring or weighing of the grain passed through the hopper. As soon as grain is introduced into the hopper, however small the quantity, it serves to depress the hopper, causing disk wheel 25 to be moved from its center point with relation to disk 15 and just as soon as it is so moved, the revolution of disk 15 causes disk 25 to be turned, and the rapidity of the turning of disk 25 will depend upon the distance of the bearing contact from the center of disk 15—the greater the distance from the center, the faster disk 25 will be turned. Any variation in the speed of the grain as it travels through the hopper, increasing the speed of the movement of paddle, will effect a corresponding acceleration in the speed of disk 25.

It will be seen from the above description that a coöperating connection between the hopper upon one side of the fulcrum point of the scale beam and the part connected with the other end of the scale beam is made shiftable relatively to accomplish the measuring by changing the speed of a driven part connected to operate the register, effected by the rise and fall of the hopper.

In practice, the parts being in normal adjustment as in Fig. 1, the paddle wheel can be turned by hand without effecting the turning of disk 25, as the contact is directly at the center of disk 15, but as weight is added by inflowing grain, disk 25 moves from the center point and as its distance from the center point is increased by increase in the weight of grain in the hopper, it will move farther and farther away from the center point, and as it moves farther away, will have a constantly longer surface to travel with the same revolution so that as disk 25 moves from the center point toward the circumference of disk 15 its speed will increase, resulting in a corresponding increase in speed of mechanism connected to operate the register, and thereby measuring the grain in proportion as its added volume increases the weight as it passes through the hopper.

Obviously, a basis of measurement must be established by causing the register to record the length of movement of disk 25 by first establishing a unit of measurement, which multiplied will effect the result, the same as in the ordinary gas meters and the like. As this principle of establishing unit of measurement is common, it is deemed unnecessary to particularize upon this point.

The structural combination herein disclosed is intended to represent only one form of embodiment of my invention. But form is not the essence of the invention. Obviously, it may be embodied in many forms of construction that will serve as well to carry out the principle and therefore do not wish to confine myself to the construction herein shown and described as it is merely offered as a means to illustrate the principle.

Spring 35 is merely shown as a type of counter force adapted to serve as a measured resisting force against the depression of a hopper.

I have shown rods 18 connected by turn buckle 19. This mechanism is provided to compensate for any lost force resulting from use in any resilient connection, as 35, that may be used between scale beam 6 and the fixed arm 36.

My invention is adapted for use in measuring any commodity or material that may be caused to flow through an inclined trough or hopper, as for instance, water, coal, or other substance, and grain is referred to herein as representing one of the commodities it is capable of weighing.

What I claim and desire to secure by Letters Patent is:

1. In a device of the class described, in combination, a suitably fulcrumed scale beam, a chute connected with one end thereof, a register, means for counterbalancing the normal weight of the chute, means connected with the scale beam for measurably resisting the depression of the chute under the weight of materials flowing therethrough, a rotatable paddle wheel supported in the chute adapted to be turned by the flow of materials therethrough, a disk on the axis of said paddle wheel, means connected with the opposite end of the scale beam from that with which the hopper is connected operable by the movement of said disk, and adjustable relatively to and from the vertical center thereof to communicate various weights of materials passing through the chute to the register.

2. In a device of the class described, in combination, a scale beam, an inclined chute connected with one end thereof, a register, means for normally counterbalancing the weight of the chute, means connected with the scale beam for measurably counteracting the depression of the chute under the varying weight of materials being passed therethrough, a rotary paddle wheel supported in the chute, a framework connected with the opposite end of the scale beam from that with which the chute is connected, provided with a driven member therein connected with the register, means connected with the framework and the paddle wheel relatively adjustable by the vertical movement of the scale beam to transmit comparatively varying lengths of movement of the paddle wheel and the driven member in the frame to measure the materials flowing through the chute.

3. In a device of the class described, in combination, a suitably fulcrumed scale beam, a vertically movable inclined chute connected therewith provided with a rotatable member suitably supported to be turned by materials flowing through the chute, a framework connected and vertically movable with the opposite end of the scale beam from that with which the chute is connected, a register and means connected with the rotary member of the chute and with the framework relatively adjustable by the movement of the chute and the framework and coöperatively related to transmit movement from the rotary member in the chute to a register.

4. In a device of the class described, in combination with a scale beam, a vertically movable chute connected with one end thereof and provided with a rotary member suitably supported therein adapted to be actuated by the flow of material through the chute, a framework connected and vertically movable with the opposite end of the scale beam from that with which the chute is connected, a register and means connected respectively with the rotary member in the chute and with the frame relatively adjustable and coöperatively related to transmit movement from said rotary member to the register for the purpose of measuring the materials that are passed through the chute.

5. In a device of the class described, the combination with a suitably fulcrumed scale beam, of a hopper connected therewith provided with a rotary member suitably supported therein adapted to be rotated by the materials flowing through the chute, a framework connected with the opposite end of the scale beam, means for balancing the chute, means connected with the scale beam to measurably resist the depression of the chute under the varying weights of materials being passed therethrough, a register, and means connected with the rotary member and with the frame work relatively adjustable with the vertical movement of the scale beam and coöperatively related to transmit the rotary movement of the member in the chute to a suitable register for the purpose of measuring materials passed through the mold.

6. In a device of the class described, the combination with a suitably fulcrumed scale beam, of a hopper connected with one end thereof provided with a rotary member therein adapted to be turned by the flow of materials therethrough, suitable means on the scale beam to counterbalance the normal weight of the chute, means connected with the scale beam for measurably counteracting the varying weight of the materials passed through the chute, a framework connected with the scale beam on the end opposite from that with which the chute is connected, a register, and means associated respectively with the rotary member and the framework for communicating the movement of the former to a register for the purpose of measuring materials passed through the chute, comprising a disk driven by the rotary member and a disk wheel upon the framework supported at right angles with the face of the disk driven by the rotary means and in contact relation therewith.

7. In a device of the class described, in combination a suitably fulcrumed scale beam, an inclined chute connected with one end thereof provided with a rotary member therein adapted to be turned by the flow of materials therethrough, a rotary member therein adapted to be turned by the flow of materials therethrough, means for counterbalancing the normal weight of the chute, means for measurably resisting the depression of the chute under the varying weight of materials passed therethrough, a framework connected with the opposite end of the scale beam, means associated respectively with the rotary member and the framework for communicating the movement of the former to a register for the purpose of measuring materials passed through the chute, comprising a vertically disposed disk upon the shaft of the rotary member, a disk wheel suitably supported upon the framework and disposed at right angles with relation to said disk and in bearing relation therewith, and normally positioned at the vertical center of said disk, whereby the opposite directions of movement of the respective ends of the scale beam will cause the disks to be moved relatively to compensate for variable quantities of materials being passed through the chute.

8. In a device of the class described, in combination, a suitably fulcrumed scale beam, an inclined chute connected with one end thereof, counterbalancing means for the chute, means connected with the scale beam for measurably resisting the downward movement of the chute under the varying weight of materials being passed therethrough, a framework connected with the opposite end of the scale beam supported to be guided in its vertical movement and against lateral turning, a register, rotary means in the chute adapted to be driven by the flow of grain therethrough, a vertically disposed disk upon the driven shaft, a shaft in the framework having a driving connection with the register, a disk wheel upon the shaft at right angles with the face of the disk and in bearing relation therewith and in the normal balance of the chute, positioned at the vertical center of said disk, whereby as the chute is depressed in varying degrees under a variable flow of materials therethrough, the disk and disk wheel will be relatively adjusted at varying distances from the center of the disk to change the speed of the disk wheel in accordance with the varying weight of the materials to cause the latter to be properly measured.

9. In a device of the class described, in combination, a suitably fulcrumed scale beam, an inclined chute connected with one end thereof, counterbalancing means for the chute, means connected with the scale beam for measurably resisting the downward movement of the chute under the varying weight of materials being passed therethrough, a framework connected with the opposite end of the scale beam supported to be guided in its vertical movement and against lateral turning, a register, rotary means in the chute adapted to be driven by the flow of material therethrough, a vertically disposed disk upon the driven shaft, a shaft in the framework laterally movable under the force of a resilient member and having a driving connection with the register, a disk wheel upon the shaft at right angles with the face of the disk and in bearing relation therewith and in the normal balance of the chute, positioned at the vertical center of said disk, whereby as the chute is depressed in varying degrees under the variable flow of materials therethrough, the disk and disk wheel will be relatively adjusted at varying distances from the center of the disk to change the speed of the disk wheel in accordance with the varying weight of the materials to cause the latter to be properly measured.

10. In a device of the class described, in combination, a suitably fulcrumed scale beam, an inclined chute connected with one end thereof, counterbalancing means for the chute, means connected with the scale beam for measurably resisting the downward movement of the chute under the varying weight of materials being passed therethrough, a framework, means comprising parts relatively adjustable longitudinally for connecting framework with the scale beam, a register, rotary means in the chute adapted to be driven by the flow of material therethrough, a vertically disposed disk upon the driven shaft, a shaft in the framework laterally movable under the force of a resilient member and having a driving connection with the register, a disk wheel upon said shaft at right angles with the face of the disk and in bearing relation therewith and in the normal balance of the chute positioned at the vertical center of said disk, whereby as the chute is depressed in varying degrees under a variable flow of materials therethrough, the disk and disk wheel will be relatively adjusted at varying distances from the center of the disk to change the speed of the disk wheel in accordance with the varying weight of the materials to cause the latter to be properly measured.

11. In a scale, in combination, a counterbalanced hopper through which grain or the like is adapted to flow, a disk driven by said flow and movable with the hopper, a register, a driven part connected to operate it, and in bearing relation with the disk, whereby the former is driven from the latter, the disk and driven part being movable relatively to cause contact at different points between the neutral axis of the disk and its circumference, as the hopper and disk are variably depressed under the varying quantities of grain passing through the hopper.

12. In combination, a register, a wheel connected to drive the former, a counterbalanced hopper through which a stream of grain or the like is adapted to flow, a disk thereon driven by the flow therethrough, having a normal centering contact relation with the wheel at its neutral axis but movable therefrom toward its circumference, under varying weights in the hopper, whereby the movement of the disk at different degrees of depression will communicate a variable speed to the wheel, which communicated to the register, will record the weight of the grain or other material flowing through the trough.

In testimony whereof I have affixed my signature in presence of two witnesses.

FRANK S. HEBDEN.

Witnesses:
MARY E. COMEGYS,
W. V. TEFFT.